(12) United States Patent
Thorn et al.

(10) Patent No.: US 8,929,863 B2
(45) Date of Patent: Jan. 6, 2015

(54) METHODS AND SYSTEMS FOR TEMPORARILY PERMITTING A WIRELESS DEVICE TO ACCESS A WIRELESS NETWORK

(71) Applicant: Evolving Systems, Inc., Englewood, CO (US)

(72) Inventors: David Thorn, London (GB); Peter John, Bristol (GB)

(73) Assignee: Evolving Systems, Inc., Englewood, CO (US)

( * ) Notice: Subject to any disclaimer, the term of this patent is extended or adjusted under 35 U.S.C. 154(b) by 0 days.

(21) Appl. No.: 13/929,147

(22) Filed: Jun. 27, 2013

(65) Prior Publication Data
US 2014/0094144 A1  Apr. 3, 2014

Related U.S. Application Data

(60) Provisional application No. 61/708,509, filed on Oct. 1, 2012.

(51) Int. Cl.
*H04W 88/02* (2009.01)
*H04W 12/06* (2009.01)

(52) U.S. Cl.
CPC ..................................... *H04W 12/06* (2013.01)
USPC .......................................................... 455/411

(58) Field of Classification Search
CPC ......... H04W 8/02; H04W 8/04; H04W 12/00; H04W 12/04; H04W 12/06; H04W 60/00; H04W 60/04; H04W 60/06; H04L 63/10; H04L 65/1066; H04L 65/1069; H04L 65/1073
USPC .............. 455/410, 411, 418, 419, 433, 435.1, 455/557, 558, 551
See application file for complete search history.

(56) References Cited

U.S. PATENT DOCUMENTS 5,539,921 A * 7/1996 Tayloe ......................... 455/13.3
5,887,253 A   3/1999 O'Neil et al.
(Continued)

FOREIGN PATENT DOCUMENTS

EP          1703760 A2      9/2006
KR   10-2001-0033025 A     4/2001
(Continued)

OTHER PUBLICATIONS

International Search Report and Written Opinion of PCT/US2008/082484 mailed on Jan. 7, 2009, 9 pages.

(Continued)

*Primary Examiner* — Diane Mizrahi
(74) *Attorney, Agent, or Firm* — Kilpatrick Townsend & Stockton LLP

(57) ABSTRACT

Various arrangements for temporarily enabling the wireless device for use on a wireless network are presented. A computer system may store a plurality of international mobile subscriber identities (IMSIs) and, associated with each IMSI of the plurality of IMSIs, an indication of a period of time of a predefined length. An authentication request indicating an IMSI of the plurality of IMSIs may be received from a wireless device, wherein the wireless device has not previously been authenticated in association with the IMSI. The IMSI may be authenticated for use on the wireless network. After authorizing the IMSI for use on the wireless network device, the period of time of the predefined length associated with the IMSI may be determined to have expired. In response to determining the period of time of the predefined length associated with the IMSI has expired, the IMSI may be deauthorized for use on the wireless network.

15 Claims, 6 Drawing Sheets

(56) References Cited

U.S. PATENT DOCUMENTS

| | | | |
|---|---|---|---|
| 6,014,561 A | 1/2000 | Molne | |
| 6,167,251 A | 12/2000 | Segal et al. | |
| 6,226,517 B1 | 5/2001 | Britt et al. | |
| 6,591,098 B1 | 7/2003 | Shieh et al. | |
| 6,603,968 B2 | 8/2003 | Anvekar et al. | |
| 6,680,601 B2 | 1/2004 | Wallgren | |
| 6,836,651 B2 | 12/2004 | Segal et al. | |
| 7,197,301 B2 | 3/2007 | Netanel | |
| 7,266,371 B1 | 9/2007 | Amin et al. | |
| 7,274,928 B2 | 9/2007 | Netanel et al. | |
| 7,289,805 B2 | 10/2007 | Tom et al. | |
| 7,386,302 B2 | 6/2008 | Riffe et al. | |
| 7,424,442 B2 | 9/2008 | Wong et al. | |
| 7,444,148 B1 | 10/2008 | Cook | |
| 7,991,394 B2 | 8/2011 | Gonen et al. | |
| 8,145,212 B2 | 3/2012 | Lopresti et al. | |
| 8,391,832 B2 * | 3/2013 | Gonzalez et al. | 455/406 |
| 8,509,767 B2 | 8/2013 | Parsons et al. | |
| 8,515,392 B2 * | 8/2013 | Chen et al. | 455/411 |
| 8,559,930 B2 * | 10/2013 | Thorn et al. | 455/414.1 |
| 8,630,614 B2 * | 1/2014 | Korkiakoski et al. | 455/406 |
| 2001/0029182 A1 | 10/2001 | McCann et al. | |
| 2002/0094808 A1 | 7/2002 | Tiedemann, Jr. et al. | |
| 2002/0177440 A1 | 11/2002 | Mukherjee | |
| 2003/0031305 A1 | 2/2003 | Netanel et al. | |
| 2003/0112976 A1 * | 6/2003 | Quick et al. | 380/270 |
| 2003/0119490 A1 | 6/2003 | Mohammed | |
| 2003/0129948 A1 | 7/2003 | Gab et al. | |
| 2003/0166398 A1 | 9/2003 | Netanel | |
| 2004/0266482 A1 * | 12/2004 | Juntunen | 455/558 |
| 2005/0020234 A1 | 1/2005 | Iivari et al. | |
| 2005/0181793 A1 | 8/2005 | Netanel | |
| 2006/0035631 A1 | 2/2006 | White et al. | |
| 2006/0143098 A1 | 6/2006 | Lazaridis | |
| 2006/0205434 A1 * | 9/2006 | Tom et al. | 455/558 |
| 2007/0300294 A1 | 12/2007 | Netanel et al. | |
| 2008/0026740 A1 | 1/2008 | Netanel | |
| 2008/0057935 A1 | 3/2008 | Netanel et al. | |
| 2008/0081592 A1 | 4/2008 | Das et al. | |
| 2008/0220740 A1 | 9/2008 | Shatzkamer et al. | |
| 2009/0011759 A1 | 1/2009 | Alperovich et al. | |
| 2009/0025070 A1 | 1/2009 | Netanel et al. | |
| 2009/0067408 A1 | 3/2009 | Leppainen et al. | |
| 2009/0109987 A1 | 4/2009 | Kampmann et al. | |
| 2009/0149175 A1 | 6/2009 | Lopresti et al. | |
| 2010/0009659 A1 | 1/2010 | Netanel et al. | |
| 2010/0159924 A1 | 6/2010 | Lagerman et al. | |
| 2010/0273462 A1 | 10/2010 | Thorn et al. | |
| 2011/0014896 A1 * | 1/2011 | Hsieh | 455/411 |
| 2011/0207454 A1 * | 8/2011 | Garg et al. | 455/432.1 |
| 2011/0281551 A1 * | 11/2011 | Gonzalez et al. | 455/406 |
| 2012/0094633 A1 | 4/2012 | Parsons et al. | |
| 2012/0094634 A1 | 4/2012 | Parsons et al. | |
| 2012/0184274 A1 | 7/2012 | Lopresti et al. | |
| 2012/0203658 A1 * | 8/2012 | Monk | 705/26.5 |
| 2012/0282924 A1 * | 11/2012 | Tagg et al. | 455/432.1 |
| 2012/0322410 A1 * | 12/2012 | Lodeweyckx | 455/411 |

FOREIGN PATENT DOCUMENTS

| | | |
|---|---|---|
| KR | 10-2005-0033956 A | 4/2005 |
| KR | 10-2006-0135003 A | 12/2006 |
| WO | 00/21275 A1 | 4/2000 |
| WO | 01/60092 A3 | 8/2001 |
| WO | 02/058361 A2 | 7/2002 |
| WO | 02/058361 A3 | 7/2002 |
| WO | 2005/083910 A1 | 9/2005 |
| WO | 2008/118638 A1 | 10/2008 |
| WO | 2008/121576 A2 | 10/2008 |

OTHER PUBLICATIONS

International Search Report and Written Opinion of PCT/US2010/032200 mailed on Nov. 30, 2010, 7pages.

International Search Report and Written Opinion of PCT/US2011/051456 mailed on Apr. 17, 2012, 7 pages.

International Search Report and Written Opinion of PCT/US2011/051464 mailed on Feb. 23, 2012, 8 pages.

International Search report and Written Opinion from PCT International Patent Application No. PCT/US2013/062721, mailed Jan. 17, 2014.

* cited by examiner

METHODS AND SYSTEMS FOR TEMPORARILY PERMITTING A WIRELESS DEVICE TO ACCESS A WIRELESS NETWORK

CROSS REFERENCE TO RELATED APPLICATION

This application claims priority to U.S. Provisional Application No. 61/708,509, filed Oct. 1, 2012, entitled "Fixed Period Single Use Mobile Data Access," the entire disclosure of which is incorporated by reference for all purposes.

BACKGROUND

Operating a mobile wireless device by an end user in a foreign country, otherwise outside a device's geographic subscription region, or in various other circumstances can be challenging. A user may pay high rates through his service provider or may need to create an account with a second, local service provider and then cancel service at the end of a trip. Such arrangements are not optimal and may result in significant inconvenience to the user.

SUMMARY

Various embodiments for temporarily permitting a wireless device to access a wireless network are presented. In some embodiments, a method for temporarily permitting a wireless device to access a wireless network is presented. The method may include storing, by a computer system functioning as part of the wireless network, a plurality of international mobile subscriber identities (IMSIs) and, associated with each IMSI of the plurality of IMSIs, an indication of a lifetime access period. The method may include receiving, by the computer system from the wireless device, an authentication request indicating an IMSI of the plurality of IMSIs, wherein the wireless device has not previously been authenticated in association with the IMSI. The method may include authorizing, by the computer system, the IMSI for use in accessing the wireless network. The method may include, after authorizing the IMSI for use on the wireless network, determining, by the computer system, the lifetime access period associated with the IMSI has expired. The method may include, in response to determining the lifetime access period associated with the IMSI has expired, revoking authorization of the IMSI for use in accessing the wireless network.

Embodiments of such a method may include one or more of the following: The method may include initiating, by the computer system, in response to the authentication request, a timer for the lifetime access period stored in association with the IMSI of the plurality of IMSIs. For a first subset of the plurality of IMSIs, the lifetime access period may be of a first predefined duration. For a second subset of the plurality of IMSIs, the lifetime access period may be of a second predefined duration that is shorter than the first predefined duration. The method may include storing the IMSI of the plurality of IMSIs to a subscriber identity module (SIM) card. The method may include packaging the SIM card in packaging that indicates the lifetime access period. Initiating the timer in association with the IMSI of the plurality of IMSIs may include recording a date and a time of the authentication of the IMSI. The method may include routing, by the wireless network, the authentication request to the computer system based on the IMSI being within a predefined range, wherein at least some other authentication requests having IMSIs outside the predefined range are alternatively routed to a home location register. Revoking authentication of the IMSI for use in accessing the wireless network may include not refreshing an entry for the IMSI in a visitor location register (VLR) or a Mobility Management Entity (MME). Revoking authorization of the IMSI for use in accessing the wireless network may include sending, by the computer system, a remove command to a visitor location register (VLR) or a Mobility Management Entity (MME). Authorizing the IMSI for use in accessing the wireless network may include authorizing the IMSI for use in accessing the wireless network exclusively for data services.

In some embodiments, a detection device for temporarily permitting a wireless device to access a wireless network is presented. The detection device may include one or more processors. The detection device may include a memory communicatively coupled with and readable by the one or more processors and having stored therein processor-readable instructions. When executed by the one or more processors, the processor-readable instructions may cause the one or more processors to cause a plurality of international mobile subscriber identities (IMSIs) to be stored and, associated with each IMSI of the plurality of IMSIs, an indication of a lifetime access period. The processor-readable instructions may cause the one or more processors to receive an authentication request indicating an IMSI of the plurality of IMSIs, wherein the wireless device has not previously been authenticated in association with the IMSI. The processor-readable instructions may cause the one or more processors to authorize the IMSI for use in accessing the wireless network. The processor-readable instructions may cause the one or more processors to, after authorizing the IMSI for use on the wireless network, determine the lifetime access period associated with the IMSI has expired. The processor-readable instructions may cause the one or more processors to, in response to determining the lifetime access period associated with the IMSI has expired, revoke authorization of the IMSI for use in accessing the wireless network.

Embodiments of such a detection device may include one or more of the following: The processor-readable instructions which, when executed by the one or more processors, may further cause the one or more processors to initiate, in response to the authentication request, a timer for the lifetime access period stored in association with the IMSI of the plurality of IMSIs. For a first subset of the plurality of IMSIs, the lifetime access period may be of a first predefined duration. For a second subset of the plurality of IMSIs, the lifetime access period may be of a second predefined duration that is shorter than the first predefined duration. Initiating the timer in association with the IMSI of the plurality of IMSIs may include recording a date and a time of the authentication of the IMSI. The processor-readable instructions which cause the one or more processors to revoke authentication of the IMSI for use in accessing the wireless network may include processor-readable instructions which, when executed by the one or more processors, further cause the one or more processors to not refresh an entry for the IMSI in a visitor location register (VLR), serving GPRS support node (SGSN) or a Mobility Management Entity (MME). The processor-readable instructions which cause the one or more processors to revoke authorization of the IMSI for use in accessing the wireless network may include processor-readable instructions which, when executed by the one or more processors, further cause the one or more processors to cause a remove command to be sent to a visitor location register (VLR), serving GPRS support node (SGSN) or a Mobility Management Entity (MME). The processor-readable instructions which cause the one or more processors to authorize the IMSI for use in accessing the wireless network may include processor-readable instructions which, when executed by the one or more processors, further cause the one or more processors to authorize the IMSI for use in accessing the wireless network exclusively for data services.

In some embodiments, an apparatus for temporarily permitting a wireless device to access a wireless network is presented. The apparatus may include means for storing a plurality of international mobile subscriber identities (IMSIs) and, associated with each IMSI of the plurality of IMSIs, an indication of a lifetime access period. The apparatus may include means for receiving, from the wireless device, an authentication request indicating an IMSI of the plurality of IMSIs, wherein the wireless device has not previously been authenticated in association with the IMSI. The apparatus may include means for authorizing the IMSI for use in accessing the wireless network. The apparatus may include means for determining, after authorizing the IMSI for use on the wireless network, the lifetime access period associated with the IMSI has expired. The apparatus may include means for revoking authorization of the IMSI for use in accessing the wireless network in response to determining the lifetime access period associated with the IMSI has expired.

Embodiments of such an apparatus may include one or more of the following: The apparatus may include means for initiating a timer for the lifetime access period stored in association with the IMSI of the plurality of IMSIs, wherein initiating occurs in response to the authentication request. For a first subset of the plurality of IMSIs, the lifetime access period may be of a first predefined duration. For a second subset of the plurality of IMSIs, the lifetime access period may be of a second predefined duration that is shorter than the first predefined duration. The apparatus may include means for storing the IMSI of the plurality of IMSIs to a subscriber identity module (SIM) card. The apparatus may include means for packaging the SIM card in packaging that indicates the lifetime access period.

BRIEF DESCRIPTION OF THE DRAWINGS

A further understanding of the nature and advantages of various embodiments may be realized by reference to the following figures. In the appended figures, similar components or features may have the same reference label.

DETAILED DESCRIPTION

Figure 1:
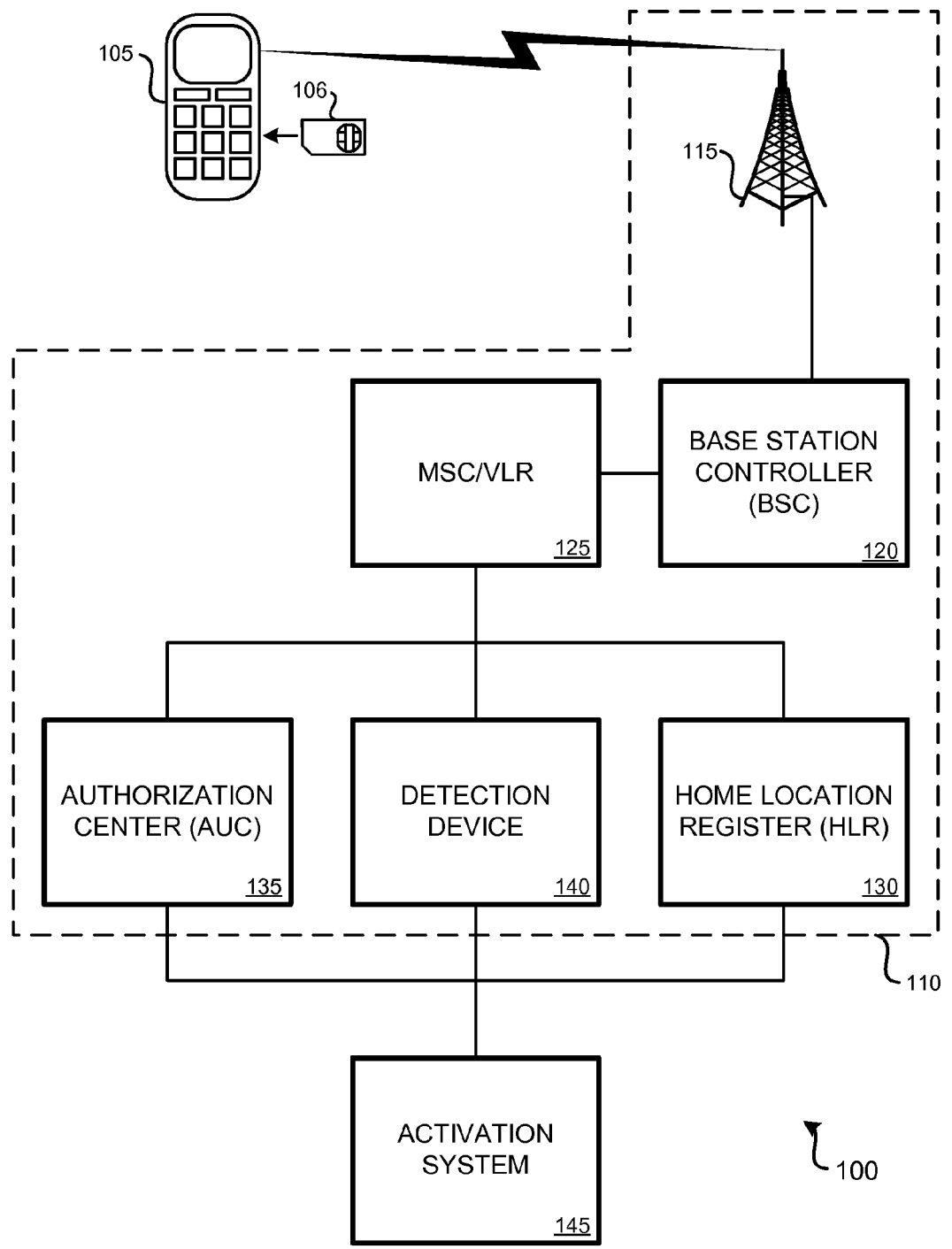
FIG. 1 illustrates an embodiment of a wireless network configured to function with a detection device.

Embodiments detailed herein allow for SIM (subscriber identity module) cards to be associated with periods of time of a fixed duration. Each SIM card may be associated with an international mobile subscriber identity (IMSI) number that is linked with a predefined period of time, referred to as a lifetime access period. When the SIM card is installed in a wireless device (such as a cellular phone or tablet computer) and the wireless device authenticates with a wireless network, the lifetime access period may be commenced. During the lifetime access period, the wireless device may be permitted access to a defined set of services of the wireless network, such as voice and/or data services. Upon the lifetime access period expiring, the wireless device, while the SIM associated with the IMSI is installed, may no longer be permitted access to the wireless network for the various services. Following expiration of an IMSI's lifetime access period, the SIM card may be useless and may be disposed of by the user.

When the SIM card is purchased by a user, the SIM and/or packaging with the SIM may be labeled to indicate the duration of the IMSI's lifetime access period. For instance, the lifetime access period may be one day or one week. Therefore, once authentication of the wireless device has been completed for the IMSI of the SIM, the lifetime access period may begin to elapse. While the lifetime access period is elapsing, a MSISDN may be temporarily assigned to the wireless device, an entry for the IMSI may be maintained in a visitor location register (VLR)/serving GPRS support node (SGSN) in the case of GSM/3G and the Mobility Management Entity (MME) in the case of LTE and the wireless device may be used to access various services of the wireless network. Upon completion of the lifetime access period, the authentication of the IMSI may be revoked by deleting the VLR/SGSN or MME entry of the IMSI. Access by the wireless device in association with the IMSI to the wireless network may no longer be permitted.

Such an arrangement involving IMSIs that are only usable during a lifetime access period may be particularly useful for travelers. For example, upon entry to a country (or other geographic or political region), a SIM card having an IMSI that has a fixed lifetime access period may be purchased by a traveler, such as at the airport at which the traveler has arrived. The traveler may install the SIM card in his wireless device. Upon authentication of the wireless device with the IMSI to be performed, the lifetime access period may commence and may permit the traveler to access various wireless services via a wireless network during the lifetime access period associated with the IMSI on the SIM card. The traveler may purchase one or more SIM cards that will allow for sufficient lifetime access periods for the duration of the traveler's visit to the country or region. Upon completion of the lifetime access period, the traveler may dispose of the associated SIM card, as the IMSI on the SIM card has expired and can no longer be used for wireless access.

Such an arrangement involving IMSIs that are only usable for a lifetime access period may also be particularly useful for special events and/or promotional purposes. For example, at an event, such as a concert festival, SIM cards having IMSIs that have fixed lifetime access periods may be distributed (e.g., for free). A concertgoer may install the SIM card in his wireless device. The concertgoer may receive access to various wireless services via a wireless network, such as free data services. Such services may be limited to the geographic vicinity of the concert festival. Further, the IMSI of the installed SIM card may permit information (e.g., advertisements, notifications) to be pushed to the concertgoer's wireless device. Additionally, the concertgoer's behaviors (e.g., travel throughout the concert venue, social media activity) may be tracked (e.g., for marketing purposes). IMSIs stored on the distributed SIM cards may be configured to expire when the concert festival ends or after a lifetime access period.

In various embodiments, the duration of lifetime access periods associated with different IMSIs on different SIM cards may be varied. Likewise, the services of a wireless network permitted to be accessed by the wireless device is associated with an IMSI during its lifetime access period may vary. For instance, a first IMSI may be associated with only data services (e.g., web browsing, email, SMS messaging), while a second IMSI may be associated with voice services (e.g., the ability to place and/or receive a phone call). The quality of service (QoS) provided to a wireless device may vary based on the IMSI. Further, other properties of the wireless service provided to a mobile device may be varied based on predefined characteristics assigned to the IMSI.

FIG. 1 illustrates a system 100, including a wireless network configured to function with a detection device. System 100 may be directed to a GSM (Global System for Mobile communications) network, 4G LTE network, or some other type of cellular network. In system 100, a wireless device 105 is in wireless communication with a wireless network 110. Wireless network 110 may include a signaling system 7 ("SS7"), SIGTRAN or DIAMETER network. It also may be possible for wireless network 110 to include a wireless intelligent network ("WIN"), a public switched telephone network ("PSTN"), and/or a data network (such as an Internet Protocol network, which can include the Internet, an Intranet, and/or the like). In system 100, wireless network 110 comprises (and/or provides communication between) base station 115 (which may be referred to as an enodeB in a 4G LTE network), base station controller (BSC) 120, mobile switching center (MSC)/visitor location register (VLR)/serving GPRS support node (SGSN)/mobility management entity (MME) 125, home location register (HLR)/home subscriber server (HSS) 130, authentication center (AUC)/Authentication, Authorization and Accounting (AAA) 135, and detection device 140. Wireless network 110 may include other components, such as a switching service point, intelligent peripheral, etc. Further, wireless network 110 may include multiple instances of base stations, base station controllers, mobile switching centers, visitor location registers, home location registers, and/or authentication centers. Likewise, it is possible that two or more of these components might be integrated in a single component or system.

Generally, wireless device 105 may be associated with an identifier, which may be an identification number (such as an IMSI). The identification number may be specific to wireless device 105. For example, the identification number may be permanently stored in ROM of wireless device 105. In some embodiments, the identifier is stored by SIM card 106 of wireless device 105. SIM card 106 may be removable, thus allowing SIM card 106 to be removed and also inserted into wireless device 105. The identification number, which may be an IMSI, may not be the same as another IMSI of another wireless device configured to attach to wireless network 110. Therefore, each wireless device in communication with wireless network 110 may be associated with an IMSI that is unique as compared with IMSIs of other wireless devices. The IMSI may be used to identify wireless device 105 to wireless network 110. An addressing number (which may be, but need not necessarily be, an MSISDN), may be assigned by wireless network 110 to address wireless device 105 based on the IMSI stored by SIM card 106. Such an MSISDN may be reassignable. Therefore, at a given time, an MSISDN may be linked with a particular IMSI of a SIM card.

When a wireless device 105 registers with wireless network 110 (e.g., wireless device 105 is powered on, enters a new service area, etc.), wireless device 105 sends a message, which is received at base station controller 120 (e.g., via base station 115). The message may include the IMSI of SIM card 106 of wireless device 105, either explicitly or implicitly (e.g., the base station controller 120 will be able to ascertain the identification number and associate it with the message, if necessary). For simplicity, this phrase may be abbreviated as "the IMSI of wireless device 105," which should be interpreted to include the IMSI of SIM card 106 of wireless device 105. Conventionally, the MSC/VLR/SGSN/MME 125 (or some other component of wireless network 110) may query the HLR/HSS 130, which returns to the MSC/VLR/SGSN/MME 125 data about wireless device 105. (While this document, for ease of description, refers to communications between the MSC/VLR/SGSN/MME 125 and other components, one skilled in the art will appreciate that, in practice, it is often either a visitor location register ("VLR"), serving GPRS support node (SGSN) or MME, which, in many cases, is collocated with the MSC 125, the MSC 125 itself and/or some combination thereof, that participates in such communications). Hence, this document sometimes refers to the MSC and VLR and/or SGSN and/or MME collectively, and references herein to operations involving the MSC/VLR/SGSN/MME 125 should be considered to include operations that might involve only a VLR, only an MSC, only a SGSN or only an MME) Such data can include the MSISDN and/or IMSI of wireless device 105, as well as the capabilities of wireless device 105.

A security key may be used to secure communication between wireless device 105 and wireless network 110. This security key (often implemented as a set of data "triplets" comprising a signed response, session key, and a random number) may be generated by authentication center 135, based on a shared secret stored in the wireless device (often referred to as Ki) and in a record in authentication center 135. In a typical implementation, HLR/HSS 130 forwards the query (or at least the wireless device's identification number) to authentication center 135 as well. Authentication center 135 may correlate the wireless device's identification number with the shared secret, such that when provided the identification number, authentication center 135 can generate the security key based on the shared secret for that wireless device and return it to MSC 125, which can use that data to authenticate wireless device 105.

Once MSC 125 has obtained the data from HLR/HSS 130 and authenticated wireless device 105 based on the security key, wireless device 105 may be operable on wireless network 110, for at least some services. Such a described activation process may populate HLR/HSS 130 and authentication center 135 with data about wireless device 105, including the identification number and shared secret data. Hence, if wireless device 105 has not been activated, neither HLR/HSS 130 nor authentication center 135 may contain records corresponding to the identification number of wireless device 105, thereby preventing wireless device 105 from registering with wireless network 110 and thus rendering wireless device 105 at least partially inoperable on wireless network 110.

In embodiments detailed herein, wireless device 105 may initiate its own activation. In accordance with a set of embodiments, in addition to base station 115, BSC 120, MSC/VLR/SGSN/MME 125, HLR/HSS 130 and AUC/AAA 135, embodiment 100 may include a detection device 140 and an activation system 145. Detection device 140 can be a component, device, and/or computer system that is configured to perform functions ascribed herein to a detection device. Detection device 140 may function as part of wireless network 110. Detection device 140 may be operated by a service provider operating wireless network 110 or by a third-party. In some cases, detection device 140 may be implemented as a modified HLR/HSS. Activation system 145 can be a computer system, component, and/or device that comprises the necessary configuration and/or software to perform the functions described below to activate the wireless device 105 through wireless network 110. In some embodiments, activation system 145 is a single computer; in other embodiments, it may be a group of computers that collectively provide the functionality described herein.

In illustrated embodiment 100, detection device 140 resides within wireless network 110, while the activation system 145 is outside wireless network 110, although activation system 145 is in communication (either directly or indirectly) with detection device 140, as well as the HLR/HSS 130, AUC/AAA 135 and/or MSC/VLR/SGSN/MME 125. (In various other arrangements, detection device 140 and/or activation system 145 may be either inside or outside wireless network 110 and/or may be in communication, either through wireless network 110 or otherwise, with various components of the network.)

Detection device 140 may be configured to act as a "quasi-HLR/HSS." In other words, the detection device (which is not an HLR/HSS 130 and generally does not perform the functions of an HLR/HSS 130), is configured to communicate with wireless network 110—and, in particular the MSC/VLR//SGSN/MME 125—as the HLR/HSS for specific IMSIs (e.g., IMSIs in a numerical range). Hence, when wireless device 105 attempts to register with wireless network 110, MSC/VLR/SGSN/MME 125 queries detection device 140, rather than HLR/HSS 130, for data about wireless device 105. MSC/VLR/SGSN/MME 125 may query detection device 140 instead of HLR/HSS 130 based on an IMSI of wireless device 105. For example, data related to IMSIs in a particular numerical range may be configured for routing to detection device 140, while IMSIs in one or more other ranges are not routed by wireless network 110 to detection device 140. Detection device 140, in turn, may contact activation system 145, which is responsible for assigning an address number to wireless device 105 and, in some cases, assigning a temporary MSISDN to wireless device 105.

In some embodiments, when an IMSI associated with a lifetime access period is received from a wireless device and used for activation via detection device 140, the IMSI and the wireless device is never activated such that an entry within HLR/HSS 130 and AUC/AAA 135 is present for the IMSI. Rather, an entry for the IMSI may only be maintained by detection device 140 and, possibly, MSC/VLR/SGSN/MME 125. Wireless network 110, based on the IMSI of wireless device 105 being within a predefined range of IMSIs may have requests, such as an authentication request, routed to detection device 140, rather than HLR/HSS 130 or AUC/AAA 135.

Figure 2:
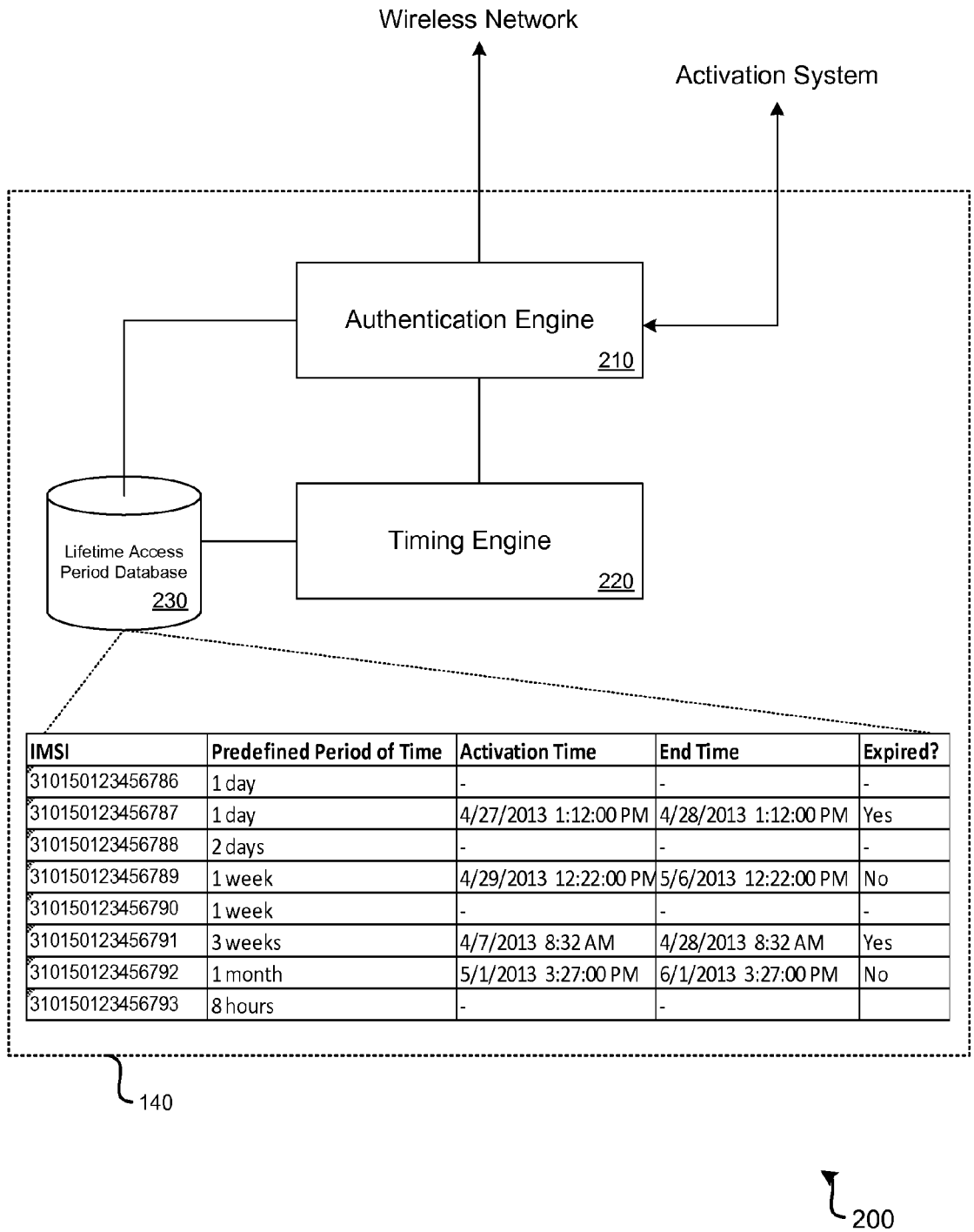
FIG. 2 illustrates an embodiment of a detection device.

FIG. 2 illustrates an embodiment 200 of a detection device 140. Detection device 140 may include an authentication engine 210, timing engine 220 and lifetime access period database 230. Detection device 140 may be implemented using one or more computer systems, such as computer system 600 of FIG. 6. Detection device 140 may be in communication with a wireless network. Detection device 140 may function as part of wireless network and/or may be operated by a third-party.

Authentication engine 210 may authenticate and revoke authentication of IMSIs based on lifetime access periods. When a request is received for authentication from a wireless device via a wireless network, authentication engine 210 may query the lifetime access period database to determine if the request is associated with a valid IMSI. If not, the request for authentication may be denied. If the request is valid, authentication engine 210 may update lifetime access period database 230 to indicate the lifetime access period has begun (such as by recording a date and/or time associated with the IMSI). For such a valid IMSI, authentication engine 210 may authenticate the IMSI such that the wireless device may perform some services with the wireless network. Authentication of the IMSI may involve authentication engine 210 having an MSISDN (or other number that can be used as a phone number) assigned to the IMSI (possibly by contacting an activation system) and/or wireless device and/or making an entry for the wireless device in a VLR/SGSN/MME. Authentication engine 210 may only activate particular wireless services for the wireless device associated with the IMSI based on an entry for the IMSI within lifetime access period database 230. For instance, only voice and/or data services may be activated for the wireless device.

Authentication engine 210 may transmit data to a VLR/SGSN/MME that indicates that an IMSI has been authenticated. Upon a lifetime access period expiring, authentication engine 210 may transmit data to the VLR/SGSN/MME indicating that the authentication of the IMSI is revoked. In some embodiments, rather than transmitting data to the VLR/SGSN/MME, the VLR/SGSN/MME may periodically query authentication engine 210 to refresh entries within the VLR/SGSN/MME. If the lifetime access period has expired for an IMSI, when a request to refresh the VLR/SGSN/MME entry for the IMSI is received by authentication engine 210 of the detection device, the VLR/SGSN/MME entry may not be refreshed, thus revoking the authentication of the IMSI to receive one or more services via the wireless network.

Lifetime access period database 230 may contain entries for multiple IMSIs. IMSIs, such as IMSIs within a particular numerical range, may be indicated within lifetime access period database 230. Entries for IMSIs within lifetime access period database 230 may indicate a lifetime access period for each IMSI. The lifetime access period for IMSIs may vary in duration. For example, a first IMSI may be associated with a lifetime access period of one day, while a second IMSI may be associated with a lifetime access period of one week. Additional data may also be stored within a lifetime access period database 230. For example, information about an activation time may be stored. The activation time may indicate the time at which the IMSI was initially authenticated by the detection device. This authentication may occur the first time a wireless device attempts to communicate with the wireless network using the IMSI. For each entry within lifetime access period database 230, an end time of the lifetime access period may be indicated. The end time may indicate when the lifetime access period expires. In some embodiments, an indication for each IMSI within lifetime access period database 230 may indicate whether or not a particular IMSI is expired. A IMSI may be expired if the IMSI has previously been activated and the lifetime access period for the IMSI has fully elapsed. Once expired, such an IMSI may not be used again. Therefore, the SIM on which the IMSI is stored and installed in the wireless device may be safely disposed of by a user.

Additional information may also be present within lifetime access period database 230. For example, for each IMSI, an indication of the permissible services to be performed using the wireless network may be indicated. For example, an IMSI may be activated for use with one or more of the following services: voice (e.g., circuit-switched calls), SMS messaging, MMS messaging, web access, voicemail services, and/or emergency services, etc.

In some embodiments, an indication of a group account may be present within an entry for an IMSI within lifetime access period database 230. Such an indication of a group account may be used for the routing of advertisements and/or notifications which are to be pushed to the wireless device associated with the IMSI. Further, data may be gathered from wireless devices associated with an IMSI that is part of a group account. For example, location information of the wireless device in which the SIM having the IMSI is installed may periodically be gathered if the IMSI is part of a particular group account. As an example, all SIM cards distributed as part of a particular promotional event may be tied to a particular group account. Particular data, such as advertisements, may be pushed to each wireless device associated with an IMSI of the group account. It should be understood that in various embodiments of lifetime access period database 230, fewer or greater number of categories of data may be present for IMSI entries.

Additional information which may be stored as part of entries within lifetime access period database 230 may include quality of service (QoS) information. For example, a user may purchase or otherwise acquire a SIM having an IMSI associated with a particular QoS. By using the IMSI of the SIM during the lifetime access period, the user may be assured that the associated wireless device in which the SIM is installed will receive at least the particular QoS. Such an arrangement may be desirable if the user is performing high priority functions using the wireless device and wireless network, such as transmitting or receiving mission critical data.

In some embodiments, lifetime access period database 230 may restrict use of an IMSI to a particular geographic region. For instance, an IMSI may be limited to use in a particular country or region. In some embodiments, the IMSI may be linked with a particular VLR/SGSN/MME, such that the IMSI may only be used in conjunction with base stations IBSCS that communicate with that VLR/SGSN/MME. For instance, if an IMSI is distributed for use at a particular event, such as a concert festival, it may be desirable for the IMSI to only work in the vicinity of the event. As such, the IMSI may be configured to only function with one or more VLRs/SGSNs/MMEs and/or one or more base stations that provide wireless service to the geographic region of the event.

Timing engine 220 may be a component of detection device 140 and may monitor whether lifetime access periods of IMSIs indicated with lifetime access period database 230 have expired. In some embodiments, timing engine 220 may check lifetime access period database 230 to determine if an end time has been reached for IMSIs. In some embodiments, timing engine 220 may calculate whether an end time has been reached based on the activation time stored for an IMSI and the lifetime access period associated with the IMSI. In some embodiments, timing engine 220 may maintain a countdown timer for each IMSI that has been activated. When the countdown timer expires, the entry within lifetime access period database 230 may be updated by timing engine 220 to indicate that the IMSI's lifetime access period has expired. In some embodiments, upon an access lifetime period elapsing, timing engine 220 may provide an indication of such to authentication engine 210 and the entry present for the IMSI in one or more VLRs/SGSNs/MMEs may be removed. If authentication engine 210 receives a request from a VLR/SGSN/MME to refresh an entry within the VLR/SGSN/MME for a particular IMSI, authentication engine 210 may query lifetime access period database 230 or may query timing engine 220.

Figure 3A:
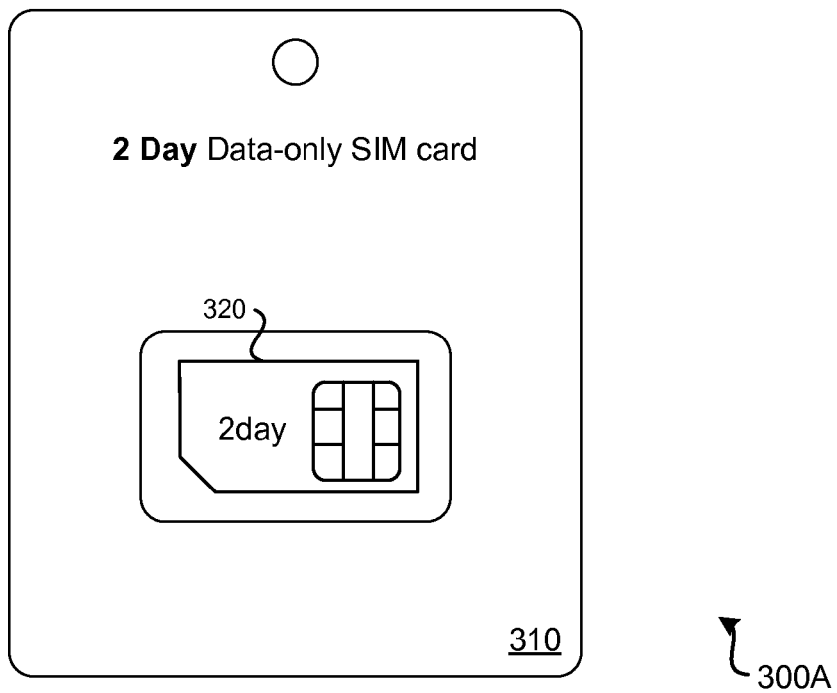
FIGS. 3A and 3B illustrate embodiments of packaged subscriber identity module (SIM) cards having encoded thereon international mobile subscriber identity (IMSI) numbers that permit access to a wireless network for lifetime access periods.
Figure 3B:
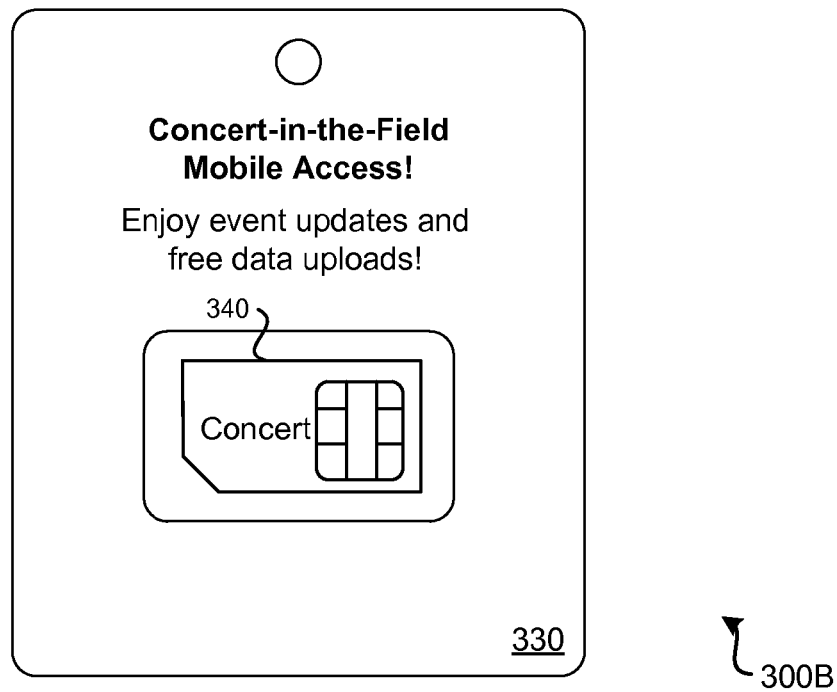

FIGS. 3A and 3B illustrate embodiments of packaged SIM cards having encoded thereon IMSI numbers that permit access to a wireless network for a lifetime access period. In FIG. 3A, embodiment 300A includes a SIM card 320 removably packaged in packaging 310. The IMSI (or other form of identifier) stored on SIM card 320 is valid for a lifetime access period of two days. Therefore, 48 hours after the IMSI is authenticated with a detection device of a wireless network, the IMSI may permanently expire. For purposes of sale or distribution to users, SIM card 320 may be packaged in packaging 310 that indicates the duration of the lifetime access period. Therefore, a user purchasing SIM card 320 is aware that the lifetime access period is two days.

In FIG. 3B, embodiment 300B includes a SIM card 340 removably packaged in packaging 330. The exemplary embodiment of SIM card 340 stores an IMSI that is intended for use in conjunction with a particular event called the "Concert-in-the-Field." This IMSI may permit a user to perform free data uploads (e.g., pictures of the concert) from his wireless device. The IMSI stored by SIM card 340, once activated/authenticated, may result in information being pushed (or periodically retrieved) by the wireless device, such as event updates. Further, marketing information may be captured from the wireless device, such as where the wireless device that has the SIM card installed travels. The IMSI of SIM card 340 may be configured to expire when the event ends. The IMSI may be further configured to only permit access to a wireless network in the vicinity of the event. Packaging 330 provides a potential user or purchaser information about the functions available with the IMSI stored on SIM card 340. A lifetime access period database may receive and store the IMSI along with data indicating the functions available for the IMSI. The functions indicated for the IMSI in the lifetime access period database may match those indicated on packaging 330.

Figure 4:
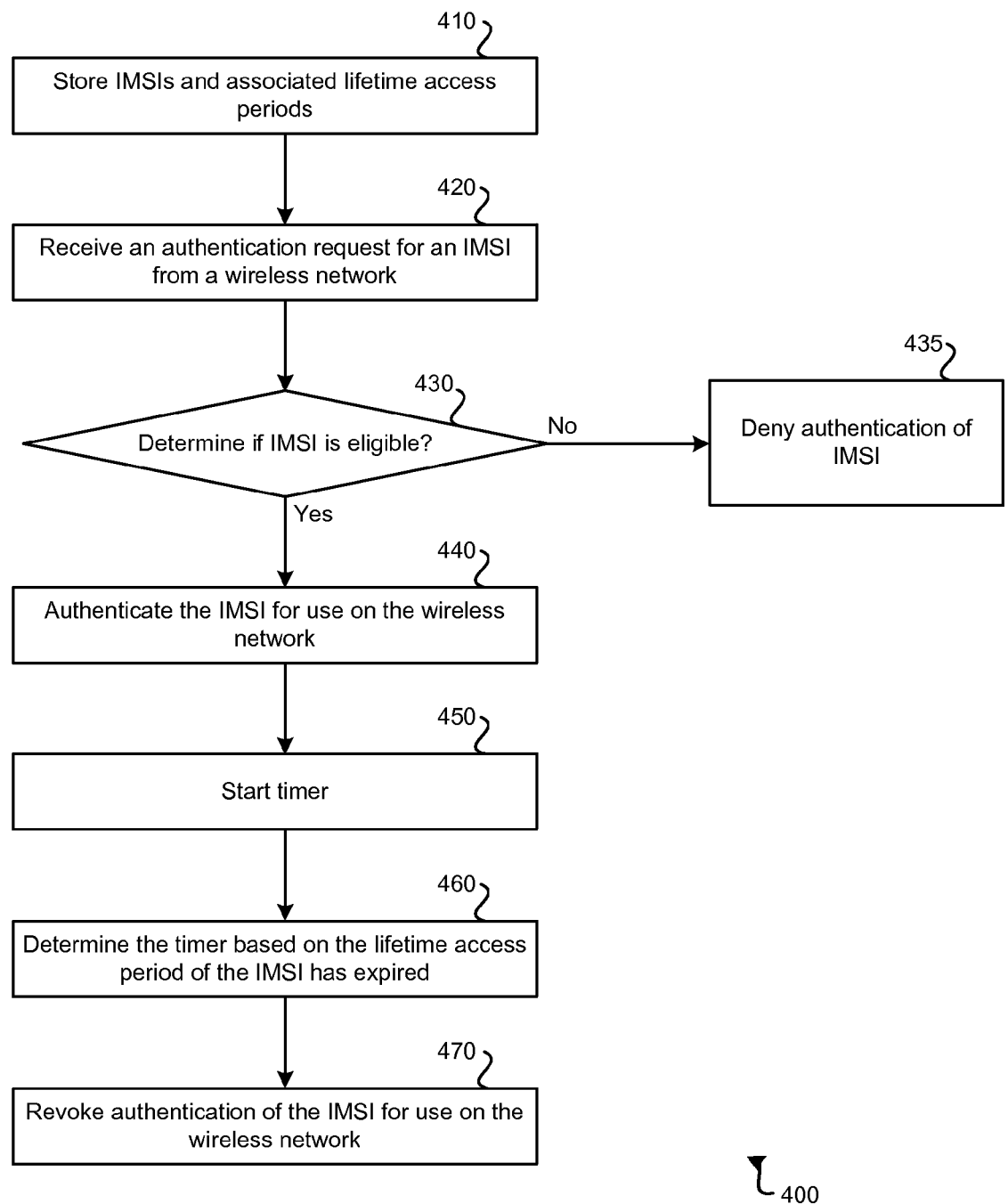
FIG. 4 illustrates an embodiment of a method for enabling a wireless device to access a wireless network for a fixed period of time.

Various methods may be performed using the devices and systems previously described. FIG. 4 illustrates an embodiment of a method 400 for permitting a wireless device access to wireless services of a wireless network for a fixed period of time. Method 400 may be performed using a GSM, 4G LTE, or some other form of cellular wireless network. Method 400 may be formed using system 100 of FIG. 1. Method 400 may also be performed using some other form of system that includes a cellular wireless network. The wireless network used to perform method 400 may include a detection device, such as detection device 140 of FIGS. 1 and 2. Each step of method 400 may be performed by a detection device. The detection device may include computerized components, such as components of computer system 600 of FIG. 6. As such, means for performing steps of method 400 includes one or more instances of components discussed in relation to FIGS. 1, 2, and 6.

At step 410, a set of IMSIs and associated lifetime access periods may be stored, such as in the form of a database, by a detection device functioning as part of a cellular wireless network. For example, the database may resemble lifetime access period database 230 of FIG. 2. The database may receive and store multiple IMSIs. For each of these IMSIs, a lifetime access period may be stored, which may vary for different IMSIs. As such, the lifetime access period associated with a first IMSI may be shorter than the lifetime access period associated with a second IMSI. In some embodiments, lifetime access periods may be 1 hour, 8 hours, 1 day, 2 days, 3 days, 1 week, 2 weeks, or 1 month in duration. It should be understood that lifetime access periods may be configured for various durations of shorter, longer, or for any duration in between the examples provided. The IMSIs stored by the lifetime access period database may be IMSIs which have been or will be encoded on SIM cards and distributed (e.g., for sale). Further, an indication of the IMSIs (e.g., a range of IMSIs or lookup table) may be provided to the wireless network such that the wireless network will route authentication requests for any of the IMSIs to the detection device.

At step 420, an authentication request for an IMSI of the set of IMSIs may be received from the wireless network. The authentication request may indicate the IMSI. The authentication request may have been initiated by a wireless device, such as a cellular phone, having a SIM card (or other storage device) that has the IMSI stored thereon installed. The wireless device may then wirelessly contact the wireless network for authentication. In response to the wireless network receiving the authentication request with the IMSI, the wireless network may route the authentication request to the detection device because the IMSI is within a range of IMSI values indicated as managed by the detection device. In some embodiments, rather than the IMSI being within a particular range of IMSI values, a lookup table may be used by the wireless network to determine that the IMSI of the wireless device is managed by the detection device.

At step 430, a determination may be made as to whether the IMSI is eligible to be authenticated by the detection device. This determination may be performed by querying a lifetime access period database to determine if the IMSI indicated in the authentication request has not yet expired. If the IMSI is expired, blocked, or otherwise not available for authentication, a response to the wireless network may be sent that denies the authentication of the IMSI at step 435, thus blocking the wireless device from access to the wireless network in conjunction with the IMSI (a small set of services may still be available, such as emergency calling services). If the IMSI is eligible for authentication, method 400 may proceed to step 440.

At step 440, the IMSI may be authenticated and authorized for use on the wireless network. Successful authentication may include a response being provided to the wireless device that provides a temporary MSISDN (e.g., phone number) for use during the lifetime access period associated with the IMSI. Successful authentication may further include an entry being added to a VLR/SGSN/MME that indicates the IMSI, temporary MSISDN, and/or services that can be performed by the wireless device. The wireless device may now be able to perform various wireless services available to the wireless device via the wireless network (the services available may be indicated in the lifetime access period database entry for the IMSI). For example, voice services and/or data services may be available to the wireless device while the SIM card storing the IMSI is installed in the wireless device.

At step 450, a timer may be started to monitor the lifetime access period associated with the IMSI. Successful authentication of the IMSI may trigger the timer to begin. The timer may take many forms. In some embodiments, the timer may be in the form of a date and/or timestamp recorded in the lifetime access period database (or in some other data storage arrangement) that indicates when the authentication was successfully performed. In conjunction with the stored duration of the lifetime access period for the IMSI, the date/time of the expiration of the lifetime access period can be determined. In some embodiments, the expiration date/time may be determined and stored in the lifetime access period database at step 450. In some embodiments, a countdown timer for the duration of the lifetime access period associated with the IMSI (as stored at step 410) is commenced at step 450. Other arrangements may be possible for determining when the lifetime access period has fully elapsed. Once the lifetime access period has begun elapsing, it may not pause. For instance, if the wireless device does not connect to the wireless network for a period of time during the lifetime access period, the lifetime access period may continue to elapse. However, in some embodiments, if the wireless device does not communicate with the wireless network for a threshold period of time (e.g., 12 hours), the lifetime access period may pause, and may resume elapsing when the wireless device is again authenticated.

Following authentication at step 440 and an MSISDN being assigned to the wireless device, the wireless device may be used by a user to access all permitted services via the wireless network. Wireless service for the wireless device may be governed by various conditions stored by the lifetime access period database in association with the IMSI. For example, conditions, in addition to the lifetime access period, may include: a limited geographic area (e.g., based on only specific VLRs/SGSNs/MMEs or base stations being available for use), a limited political area (e.g., a specific country or region), a QoS, specific data and/or voice services, and/or an association with a group account (for pushing of specific information to the wireless device, such as advertisements). After a duration of time, which is likely known to the user due to printing on the SIM card storing the IMSI and/or printing on the packaging in which the SIM card was packaged, the lifetime access period of the IMSI may expire.

At step 460, a determination may be made that the timer has expired. As such, the lifetime access period of the IMSI has completed. Thus, once step 460 is reached, the IMSI is no longer valid for access to the wireless network. The lifetime access period database may be updated to indicate the expiration of the IMSI.

At step 470, the authentication of the IMSI for use on the wireless network may be revoked. This revocation may be performed in multiple ways. In some embodiments, a message may be sent to one or more VLRs/SGSNs/MMEs indicating that entries for the IMSI are to be deleted. In other embodiments, a VLR/SGSN/MME may periodically contact the detection device to refresh entries. When the VLR/SGSN/MME contacts the detection device, the detection device may not refresh the entry for the IMSI, thus effectively causing its removal from the VLR/SGSN/MME and causing future services to the wireless device associated with the IMSI to not be available. The wireless device that has the SIM card with the IMSI installed may now no longer be used to access the wireless network (except, possibly, for a small subset of services, such as an emergency phone call).

Following step 470, either immediately or after a predefined period of time, the detection device may reassign the MSISDN previously assigned to the IMSI. Therefore, the MSISDN that was temporarily assigned to the IMSI for use during the lifetime access period, may be either temporarily or permanently reassigned to another IMSI. While not in use, the MSISDN may be stored as part of a pool of available MSISDNs by the detection device.

Following step 470, the IMSI's lifetime may be complete. As such, the SIM card on which the IMSI was installed may be useless and may be discarded by the user of the wireless device. Since the IMSI is expired and can no longer be used, the user may not need to worry about any nefarious use of the discarded SIM card having the IMSI. As such, once the lifetime access period of the IMSI has expired, the user may not need to take any action to conclude wireless service. If the user desires additional wireless service, the user may acquire another SIM card having an IMSI associated with another lifetime access period, which can then be installed in the user's wireless device.

Figure 5:
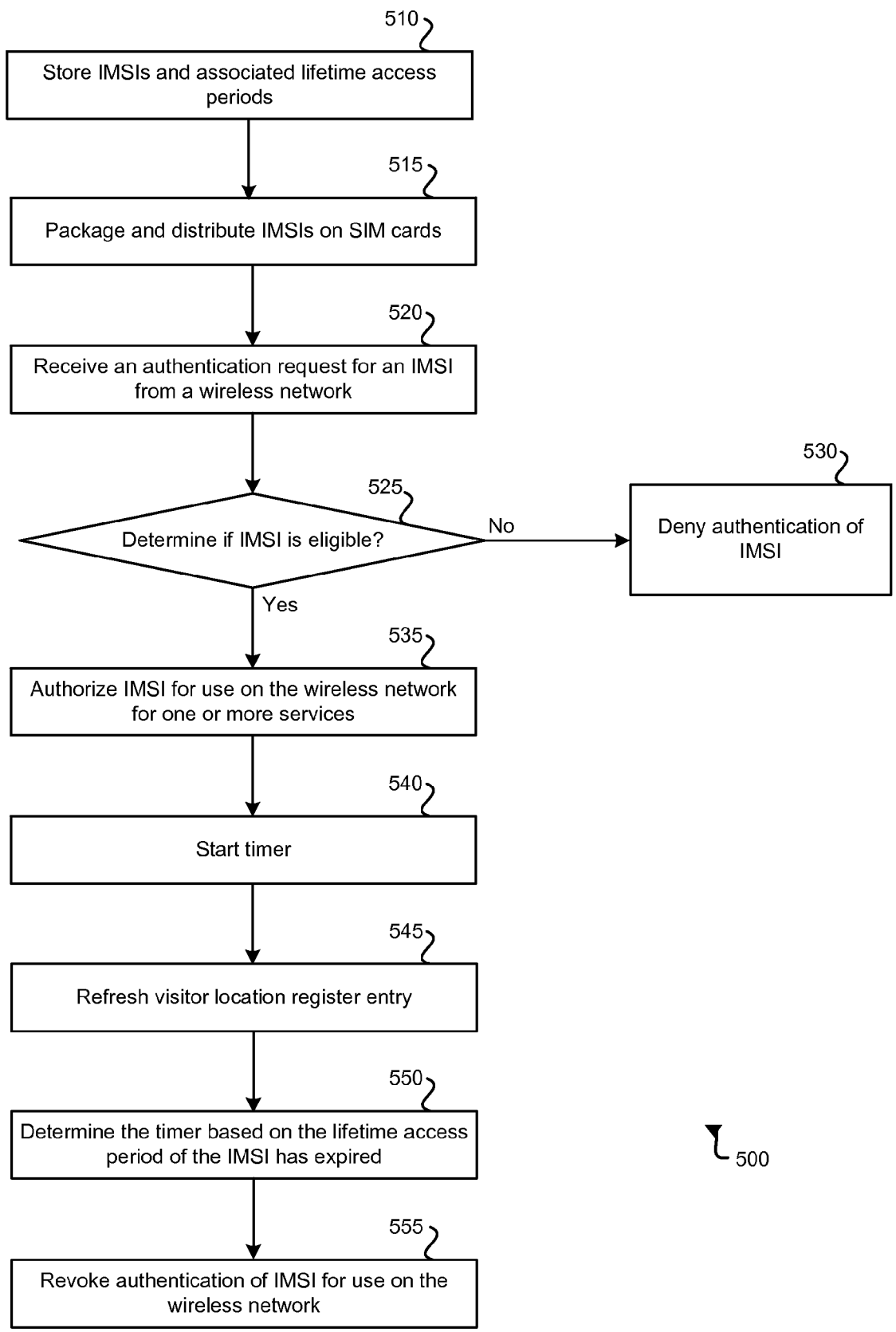
FIG. 5 illustrates another embodiment of a method for enabling a wireless device to access a wireless network for a fixed period of time.

FIG. 5 illustrates another embodiment of a method 500 for permitting a wireless device access to wireless services of a wireless network for a fixed period of time. Method 500 may be performed using a GSM, 4G LTE, or some other form of cellular wireless network. Method 500 may be formed using system 100 of FIG. 1. Method 500 may also be performed using some other form of system that includes a cellular wireless network. The wireless network used to perform method 500 may include a detection device, such as detection device 140 of FIGS. 1 and 2. Each step of method 500 may be performed by a detection device. The detection device may include computerized components, such as components of computer system 600 of FIG. 6. As such, means for performing steps of method 500 includes one or more instances of components discussed in relation to FIGS. 1, 2, and 6. Embodiments of method 500 may represent more detailed embodiments of method 400 of FIG. 4.

At step 510, a set of IMSIs and associated lifetime access periods may be stored, such as in the form of a database, by a detection device functioning as part of a cellular wireless network. For example, the database may resemble lifetime access period database 230 of FIG. 2. The database may receive and store multiple IMSIs. For each of these IMSIs, a lifetime access period may be stored, which may vary for different IMSIs. As such, the lifetime access period associated with a first IMSI may be shorter than the lifetime access period associated with a second IMSI. In some embodiments, lifetime access periods may be 1 hour, 8 hours, 1 day, 2 days, 3 days, 1 week, 2 weeks, or 1 month in duration. It should be understood that lifetime access periods may be configured for various durations of shorter, longer, or for any duration in between the examples provided. In addition to storing lifetime access periods for various IMSIs, various conditions for each IMSI may be stored, such as: a limited geographic area (e.g., based on only specific VLRs/SGSNs/MMEs or base stations being available for use), a limited political area (e.g., a specific country or region), a QoS, specific data and/or voice services, and/or an association with a group account (for pushing of specific information to the wireless device, such as advertisements). Further, an indication of the IMSIs (e.g., a range of IMSIs or lookup table) may be provided to the wireless network such that the wireless network will route authentication requests for any of the IMSIs to the detection device.

The IMSIs stored by the lifetime access period database may be encoded on SIM cards and distributed (e.g., for sale, for free as a promotion) at step 515. Each IMSI may be packaged on a SIM card such that the lifetime access period and/or other conditions attached to the IMSI may be made known to potential users. In some embodiments, it may be possible to distribute the IMSIs in a form other than stored by a SIM card.

At step 520, an authentication request for an IMSI of the set of IMSIs may be received from the wireless network. The authentication request may indicate the IMSI. The authentication request may have been initiated by a wireless device, such as a cellular phone, having a SIM card (or other storage device) that has the IMSI stored thereon installed. The wireless device may then wirelessly contact the wireless network for authentication. The authentication message may be in the form of a "Send Authentication Information" message for 2G/3G access or a "DIAMETER Authentication" message for LTE access. In response to the wireless network receiving the authentication request with the IMSI, the wireless network may route the authentication request to the detection device because the IMSI is within a range of IMSI values indicated as managed by the detection device. In some embodiments, rather than the IMSI being within a particular range of IMSI values, a lookup table may be used by the wireless network to determine that the IMSI of the wireless device is managed by the detection device. The routing within the SS7 (signaling system no. 7), or DIAMETER (in the case of LTE access with a SAE (Service Architecture Evolved) core), messages related to an IMSI within an IMSI range is delivered to the detection device instead of the HLR/HSS of the wireless network.

At step 525, a determination may be made as to whether the IMSI is eligible to be authenticated by the detection device. This determination may be performed by querying a lifetime access period database to determine if the IMSI indicated in the authentication request has not yet expired. If the IMSI is expired, blocked, or otherwise not available for authentication, a response to the wireless network may be sent that denies the authentication of the IMSI at step 530, thus blocking the wireless device from access to the wireless network in conjunction with the IMSI. If the IMSI is eligible for authentication, method 400 may proceed to step 535.

At step 535, the IMSI may be authenticated and authorized for use on the wireless network. The detection device may receive one or more "Location Update" messages from the wireless network. These one or more messages may be a request from a VLR, SGSN (serving GPRS support node), or MME (Mobility Management Entity) for the subscriber profile which would normally be stored by a HLR/HSS. Successful authentication may include a response being provided to the wireless device that provides a temporary MSISDN for use during the lifetime access period associated with the IMSI. The temporary MSISDN may be selected from a pool of available temporary MSISDNs. Successful authentication may further include an entry being added to one or more VLRs/SGSNs/MMEs that indicates the IMSI, temporary MSISDN, and/or services that can be performed by the wireless device. The detection device may send an "Insert Subscriber Data" message with the appropriate profile in the case where the requesting entity is the VLR, MME or SGSN or as part of the "Update Location Acknowledge" with the MME. It should be noted, at no point may an entry for the ISDN or temporary MSISDN be added to an HLR/HSS or AUC/AAA. Rather, all authentication requests are handled through the detection device and one or more VLRs/SGSNs/MMEs. The wireless device may now be able to perform various wireless services available to the wireless device via the wireless network (the services available may be indicated in the lifetime access period database entry for the IMSI). For example, voice services and/or data services may be available to the wireless device while the SIM card storing the IMSI is installed in the wireless device.

At step 540, a timer may be started to monitor the lifetime access period associated with the IMSI. Successful authentication of the IMSI may trigger the timer to begin. The timer may take many forms, such as those detailed in relation to step 450 of method 400. Once the lifetime access period has begun elapsing, it may not pause. For instance, if the wireless device does not connect to the wireless network for a period of time during the lifetime access period, the lifetime access period may continue to elapse. However, in some embodiments, if the wireless device does not communicate with the wireless network for a threshold period of time (e.g., 2 hours, 1 day, or some other predefined time period), the lifetime access period may pause, and may resume elapsing when the wireless device is again authenticated.

Following authentication at step 535 and an MSISDN being assigned to the wireless device, the wireless device may be used by a user to access all permitted services via the wireless network. Wireless service for the wireless device may be governed by various conditions stored by the lifetime access period database in association with the IMSI. For example, conditions, in addition to the lifetime access period, may include: a limited geographic area (e.g., based on only specific VLRs/SGSNs/MMEs or base stations being available for use), a limited political area (e.g., a specific country or region), a QoS, specific data and/or voice services, and/or an association with a group account (for pushing of specific information to the wireless device, such as advertisements). After a duration of time, which is likely known to the user due to printing on the SIM card storing the IMSI and/or printing on the packaging in which the SIM card was packaged, the lifetime access period of the IMSI may expire.

During the lifetime access period, the detection device may act in the role of an HLR or HSS providing mobile data access to a configured APN (access point name). There may be no conventional provisioning step because the IMSI of the SIM is never activated in the traditional HLR/HSS infrastructure of the wireless network.

At step 545, a VLR/SGSN/MME entry for the IMSI may be refreshed by the detection device upon receiving a request from a VLR/SGSN/MME. The request from the VLR/SGSN/MME may be routed to the detection device by the wireless network (instead of to the HLR/HSS) based on the IMSI. When the refresh request is received, the detection device may query the lifetime access period database to determine if the lifetime access period of the IMSI has expired. If not, the VLR/SGSN/MME entry may be refreshed by the detection device. If expiration has been reached, the VLR/SGSN/MME entry may not be refreshed. Refreshing of the VLR/SGSN/MME may occur one or more times during the lifetime access period associated with the IMSI.

At step 550, a determination may be made that the timer has expired. As such, the lifetime access period of the IMSI has completed. Thus, once step 550 is reached, the IMSI is no longer valid for access to the wireless network. The lifetime access period database may be updated to indicate the expiration of the IMSI.

At step 555, the authentication of the IMSI for use on the wireless network may be revoked. When a VLR//SGSN/MME contacts the detection device to refresh an entry for the IMSI, the detection device may not refresh the entry for the IMSI, thus effectively causing its removal from the VLR/SGSN/MME and causing future services to the wireless device associated with the IMSI to not be available. (In some embodiments, upon the timer expiring, a message may be sent to one or more VLRs/SGSNs/MMEs indicating that entries for the IMSI are to be deleted.) The wireless device that has the SIM card with the IMSI installed may now no longer be used to access the wireless network (except, possibly, for a small subset of services, such as an emergency phone call).

Following step 555, either immediately or after a predefined period of time, the detection device may reassign the MSISDN previously assigned to the IMSI. Therefore, the MSISDN that was temporarily assigned to the IMSI for use during the lifetime access period, may be either temporarily or permanently reassigned to another IMSI. While not in use, the MSISDN may be stored as part of a pool of available MSISDNs by the detection device.

Following step 555, the IMSI's lifetime may be complete. As such, the SIM card on which the IMSI was installed may be useless and may be discarded by the user of the wireless device. Since the IMSI is expired and can no longer be used, the user may not need to worry about any nefarious use of the discarded SIM card having the IMSI. As such, once the lifetime access period of the IMSI has expired, the user may not need to take any action to conclude wireless service. If the user desires additional wireless service, the user may acquire another SIM card having an IMSI associated with another lifetime access period, which can then be installed in the user's wireless device.

Embodiments detailed herein focus mainly on the use of terms directed to GSM networks. However, it should be understood that similar principles can be applied to managing lifetime access periods for IMSIs (or other forms of identifiers) for other types of wireless networks, such as 4G LTE networks.

Figure 6:
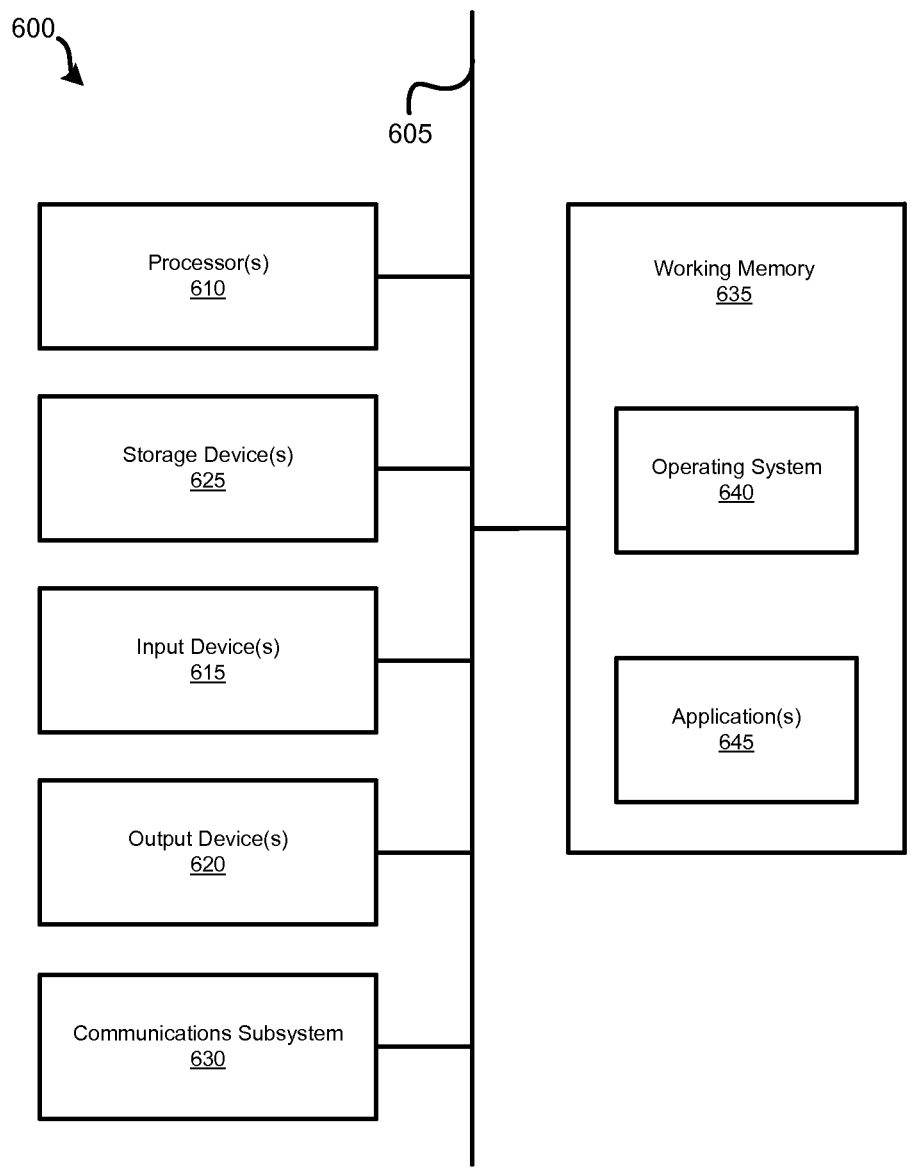
FIG. 6 illustrates an embodiment of a computer system which may be used as the detection device.

FIG. 6 illustrates an embodiment of a computer system 600 which may be used as the detection device and/or components of the various wireless networks discussed herein. More generally, a computer system as illustrated in FIG. 6 may be incorporated as part of the previously described computerized devices. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, video decoders, and/or the like); one or more input devices 615, which can include, without limitation, a mouse, a keyboard, remote control, and/or the like; and one or more output devices 620, which can include, without limitation, a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 600 might also include a communications subsystem 630, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for temporarily permitting a wireless device to access a wireless network, the method comprising:
   storing, by a computer system functioning as part of the wireless network, a plurality of international mobile subscriber identities (IMSIs) and, associated with each IMSI of the plurality of IMSIs, an indication of a lifetime access period;
   receiving, by the computer system from the wireless device, an authentication request indicating an IMSI of the plurality of IMSIs, wherein the wireless device has not previously been authenticated in association with the IMSI;
   authenticating, by the computer system, the IMSI for use in accessing the wireless network;
   after authenticating the IMSI for use on the wireless network, determining, by the computer system, the lifetime access period associated with the IMSI has expired; and
   in response to determining the lifetime access period associated with the IMSI has expired, revoking authentication of the IMSI for use in accessing the wireless network.

2. The method for temporarily permitting the wireless device to access the wireless network of claim 1, the method further comprising:
   initiating, by the computer system, in response to the authentication request, a timer for the lifetime access period stored in association with the IMSI of the plurality of IMSIs.

3. The method for temporarily permitting the wireless device to access the wireless network of claim 2, wherein initiating the timer in association with the IMSI of the plurality of IMSIs comprises recording a date and a time of the authentication of the IMSI.

4. The method for temporarily permitting the wireless device to access the wireless network of claim 1, wherein:
   for a first subset of the plurality of IMSIs, the lifetime access period is of a first predefined duration; and
   for a second subset of the plurality of IMSIs, the lifetime access period is of a second predefined duration that is shorter than the first predefined duration.

5. The method for temporarily permitting the wireless device to access the wireless network of claim 1, the method further comprising:
   routing, by the wireless network, the authentication request to the computer system based on the IMSI being within a predefined range, wherein at least some other authentication requests having IMSIs outside the predefined range are alternatively routed to a home location register.

6. The method for temporarily permitting the wireless device to access the wireless network of claim 1, wherein revoking authentication of the IMSI for use in accessing the wireless network comprises not refreshing an entry for the IMSI in a visitor location register (VLR), serving GPRS support node (SGSN), or a Mobility Management Entity (MME).

7. The method for temporarily permitting the wireless device to access the wireless network of claim 1, wherein revoking authentication of the IMSI for use in accessing the wireless network comprises sending, by the computer system, a remove command to a visitor location register (VLR), serving GPRS support node (SGSN), or a Mobility Management Entity (MME).

8. The method for temporarily permitting the wireless device to access the wireless network of claim 1, wherein authenticating the IMSI for use in accessing the wireless network comprises authenticating the IMSI for use in accessing the wireless network exclusively for data services.

9. A detection device for temporarily permitting a wireless device to access a wireless network, the detection device comprising:
   one or more processors; and
   a memory communicatively coupled with and readable by the one or more processors and having stored therein processor-readable instructions which, when executed by the one or more processors, cause the one or more processors to:
      cause a plurality of international mobile subscriber identities (IMSIs) to be stored and, associated with each IMSI of the plurality of IMSIs, an indication of a lifetime access period;
      receive an authentication request indicating an IMSI of the plurality of IMSIs, wherein the wireless device has not previously been authenticated in association with the IMSI;
      authenticate the IMSI for use in accessing the wireless network;
      after authenticating the IMSI for use on the wireless network, determine the lifetime access period associated with the IMSI has expired; and
      in response to determining the lifetime access period associated with the IMSI has expired, revoke authentication of the IMSI for use in accessing the wireless network.

10. The detection device for temporarily permitting the wireless device to access the wireless network of claim 9, wherein the processor-readable instructions which, when executed by the one or more processors, further cause the one or more processors to:
    initiate, in response to the authentication request, a timer for the lifetime access period stored in association with the IMSI of the plurality of IMSIs.

11. The detection device for temporarily permitting the wireless device to access the wireless network of claim 10, wherein initiating the timer in association with the IMSI of the plurality of IMSIs comprises recording a date and a time of the authentication of the IMSI.

12. The detection device for temporarily permitting the wireless device to access the wireless network of claim 9, wherein:
    for a first subset of the plurality of IMSIs, the lifetime access period is of a first predefined duration; and
    for a second subset of the plurality of IMSIs, the lifetime access period is of a second predefined duration that is shorter than the first predefined duration.

13. The detection device for temporarily permitting the wireless device to access the wireless network of claim 9, wherein the processor-readable instructions which cause the one or more processors to revoke authentication of the IMSI for use in accessing the wireless network comprises processor-readable instructions which, when executed by the one or more processors, further cause the one or more processors to:
    not refresh an entry for the IMSI in a visitor location register (VLR), serving GPRS support node (SGSN), or a Mobility Management Entity (MME).

14. The detection device for temporarily permitting the wireless device to access the wireless network of claim 9, wherein the processor-readable instructions which cause the one or more processors to revoke authentication of the IMSI for use in accessing the wireless network comprises processor-readable instructions which, when executed by the one or more processors, further cause the one or more processors to:
    cause a remove command to be sent to a visitor location register (VLR), serving GPRS support node (SGSN), or a Mobility Management Entity (MME).

15. The detection device for temporarily permitting the wireless device to access the wireless network of claim 9, wherein the processor-readable instructions which cause the one or more processors to authenticate the IMSI for use in accessing the wireless network comprises processor-readable instructions which, when executed by the one or more processors, further cause the one or more processors to:
    authenticate the IMSI for use in accessing the wireless network exclusively for data services.

* * * * *